United States Patent [19]
Wilks

[11] Patent Number: 5,879,029
[45] Date of Patent: Mar. 9, 1999

[54] WATER HOSE SYSTEM

[76] Inventor: John E. Wilks, 10555 W. Little York, Houston, Tex. 77041

[21] Appl. No.: 492,673

[22] Filed: Jun. 20, 1995

[51] Int. Cl.[6] ................................................ F16L 21/00
[52] U.S. Cl. ............................. 285/8; 285/23; 285/131.1
[58] Field of Search ............................. 285/155, 8, 23, 285/131.1

[56] References Cited

U.S. PATENT DOCUMENTS

| | | | |
|---|---|---|---|
| 746,801 | 12/1903 | Earheart | 285/155 X |
| 931,890 | 8/1909 | Rheinfrank et al. | 285/8 X |
| 1,005,356 | 10/1911 | Swift | 285/8 X |
| 1,747,211 | 2/1930 | Ball | 285/155 X |
| 1,773,643 | 8/1930 | Romanchak | 285/155 X |
| 1,963,522 | 6/1934 | Gavaza | 285/8 X |
| 2,505,303 | 4/1950 | Randa | 285/155 |
| 2,525,419 | 10/1950 | Mellinger et al. | 285/155 X |
| 2,656,853 | 10/1953 | Scheele | 285/155 X |
| 3,567,259 | 3/1971 | Benson et al. . | |
| 3,873,391 | 3/1975 | Plauka et al. . | |
| 4,017,103 | 4/1977 | Lorkowski . | |
| 4,236,736 | 12/1980 | Anderson . | |
| 4,326,735 | 4/1982 | Hunder et al. | 285/15 |
| 4,523,914 | 6/1985 | Faulconer et al. | 441/108 |
| 5,104,150 | 4/1992 | Bard et al. . | |
| 5,250,041 | 10/1993 | Folden et al. | 285/155 X |
| 5,257,826 | 11/1993 | Prassas et al. . | |
| 5,333,916 | 8/1994 | Burkit . | |
| 5,344,193 | 9/1994 | Rio . | |
| 5,347,913 | 9/1994 | Stepner | 92/58.1 |
| 5,368,341 | 11/1994 | Larson | 285/260 |
| 5,375,891 | 12/1994 | Sicotte et al. . | |

FOREIGN PATENT DOCUMENTS

| | | | |
|---|---|---|---|
| 246304 | 6/1993 | Australia | 285/155 |

*Primary Examiner*—Dave W. Arola
*Attorney, Agent, or Firm*—Miller, Sisson, Chapman & Nash

[57] ABSTRACT

A hose system comprising a generally Y-shaped first hose section having first and second arm members and a faucet-connecting member, the first section further comprised of flexible walls of the first and the second arm joining the faucet-connecting member at a junction, and connectors adapted to the ends of the first arm member, second arm member, and faucet-connecting member removed from the junction for connecting the first section to either a hose or a faucet.

11 Claims, 1 Drawing Sheet

WATER HOSE SYSTEM

FIELD OF THE INVENTION

This invention relates to a water hose system, more particularly a hose system comprising water hose with a multiplicity of Y-shaped hose sections for connecting to either a faucet or to one another.

BACKGROUND OF THE INVENTION

Frequently, a single outside water faucet, to which a single water hose is attachable, is insufficient for a homeowner's needs. More specifically, a homeowner may wish to simultaneously wash the car in the driveway and to water the lawn at the same time. With but a single outlet available, and a single hose, a homeowner would be required to choose one or the other; or the homeowner would have to provide a rigid T-fitting and purchase two separate hoses to run off the T-fitting.

Applicant, however, provides in a unique hose system a Y-shaped water hose that overcomes the limitations of a single outside faucet. More specifically, applicant's bifurcated hose, where a single hose splits into two sections, provides sufficient flexibility to the homeowner to permit the performance of two jobs at once from but a single outside faucet.

SUMMARY OF THE INVENTION

Applicant provides a hose system utilizing first and second Y-shaped hose sections which provide a homeowner, especially that homeowner with a single outside faucet, with diversity and economy. The homeowner is provided with a single hose section that can do the work of two hoses while connecting to a single outside faucet. In the alternative, one of the ends of the first section could be capped for additional pressure to the uncapped end. Likewise, the homeowner can bring the diverted water back into a single hose section while providing additional length to the hose by utilizing the second Y-shaped hose section, and appropriate hose connectors.

DETAILED DESCRIPTION OF THE PREFERRED EMBODIMENT

Figure 1:
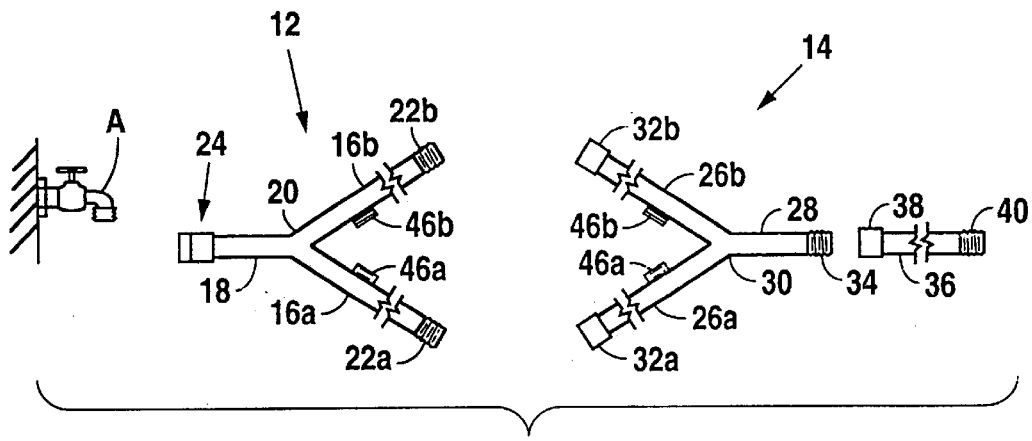
FIG. 1 is a side elevational view of applicant's novel hose system.

FIG. 1 illustrates applicant's water hose system (10). As can be seen from FIG. 1, the hose system is comprised of a first Y-shaped hose section (12) and a separate, second Y-shaped hose section (14), the two sections joinable as set forth in more detail below.

First Y-shaped hose section (12) is comprised of two, typically identically-shaped, arm members (16a) and (16b) joining a faucet-connecting member (18) at first junction (20), the included angle between the two arm members being typically acute, between 10° and 60°. The two arm members (16a) and (16b) are typically the same length, between 30 feet and 150 feet in length, and preferably between 50' and 100' in length. The faucet-connecting member is typically 1 foot to 3 feet in length, preferably 2 feet in length. The first section is comprised of typical flexible garden hose material.

The removed ends of the two arm members and the faucet-connecting member are typically comprised of connecting means. Arm member (16a) has a male threaded end (22a) at the removed end thereof. Likewise, the removed end of arm member (16b) is comprised of a male threaded member (22b). These connector means, as are all the connector means set forth herein, are known in the prior art and are connected to the hose sections by means well known in the art.

At the removed end of faucet connecting member (18) is a female socket end (24). Typically, this will be used to connect to faucets, such as that illustrated by the designation "A" in FIG. 1.

Turning now to second Y-shaped hose section (14), it is seen that it is similar to the first Y-shaped hose section. More specifically, the second Y-shaped hose section (14) is comprised of two arm members (26a) and (26b). The arm members join end member (28) at junction (30), the junction defined, in part, by an included angle of between 10° and 60°, typically acute. The removed ends of the two arm members and the end member of second Y-shaped hose section (14) have connector means to allow the second section to be joined to the first Y-shaped hose section as well as to allow the second Y-shaped hose section to connect to a typical single unbifurcated water hose. That is, the removed ends of the two arm members of the second Y-shaped hose section are comprised of female socket ends (32a) and (32b), respectively. End member (28) of second Y-shaped hose section (14) terminates at male threaded end (34). Typically, arm members (26a) and (26b) are 1 foot to 3 feet in length, preferably about 2 feet. End member (28) is typically between 1 foot and 3 feet in length.

The last component of applicant's hose system (10) is a typical straight section (unbifurcated) hose (36) having at the removed end thereof first coupler (38) and at the near end thereof, second coupler (40). The straight section (36) may be coupled to any of the removed ends of the two Y-shaped sections as the need arises. Likewise, the first section may be used alone or joined with the second section to bring the water stream, diverted at the junction of the first Y-shaped hose section back into a single stream at the junction of the second Y-shaped hose section.

Figure 2:
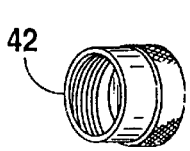
FIG. 2 is a cross sectional view of a cap to close off the threaded ends of the hose sections of applicant's hose system.
Figure 3:
FIG. 3 is a side elevational view of a plug for closing off the socket ends of the sections of applicant's hose system.

FIGS. 2 and 3 illustrate auxiliary components for use with applicant's water hose system (10). More specifically, FIG. 2 illustrates a cap (42) that can be utilized to block flow out of ends (22a), (22b) or (34) as the need arises. Likewise, FIG. 3 illustrates a plug that may be utilized to block water flow through ends (32a), (32b) or (24) as the need arises.

Figure 4A:
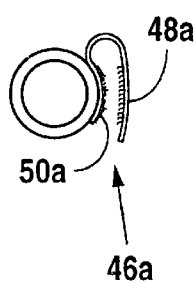
FIGS. 4a and 4b are cross-section, front elevational views of sections of the hose taken through the attachment means of applicant's present invention.
Figure 4B:
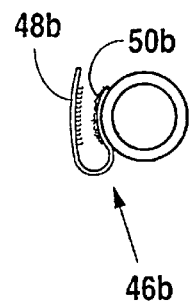

FIGS. 4a and 4b illustrate cross-sectional views (see also FIG. 1) illustrating attachment means (46a) and (46b) which allow the arm members of both the first and second sections to attach one to the other so that the two hoses run along a generally parallel course and stay together as a single unit. Typically, attachment means (46a) and (46b) are VEL-CRO® closure pads of the hook and loop type, having covers (48a) and (48b) covering the hook (50a) and loop (50b), or vice versa. The cover is used to prevent debris and inadvertent coupling of the arm members one to another.

When attachment is desired, covers (48a) and (48b) are pulled off to expose the hook and loop combination (50a) and (50b), which are pressed together. This feature may be useful in storing the hose or when the hose is in actual use as a single unit. Further, the attachment means is located on the surface of the arm members at regular intervals, typically 1 foot apart, between the point at which the end members split off and their removed ends.

Figure 5:
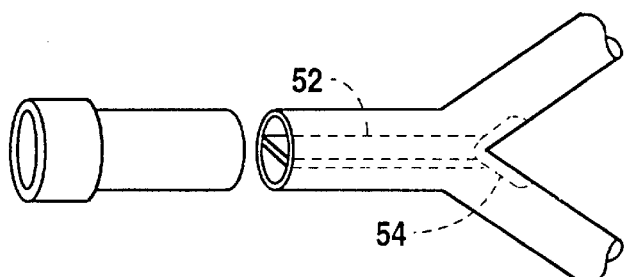
FIG. 5 is a side elevation of the hose system including a diverter.

FIG. 5 illustrates one manner in which the water in a hose section may be diverted into two sections through the use of a pliable, flexible plastic membrane (52) (typically soft vinyl) integral with the inner sidewalls of at least part of faucet connecting member (18), typically close to the first junction (20). Membrane (52) sections the water flow before first junction (20). Similar membranes are found in flat, sprinkler/soaker hoses under the trademark KGRO™ by Anchor Swan of Columbus, Ohio. Plastic reinforcement member (54) lies adjacent the inner walls to strengthen the junction.

There are additional variations and permutations available to applicant's hose system, the foregoing being only an example. This system may be used domestically by the homeowner as well as commercially or industrially. Further, applicant's system will be useful for firefighting.

Terms such as "left," "right," "up," "down," "bottom," "top," "front," "back," "in," "out," and like are applicable to the embodiments shown and described in conjunction with the drawings. These terms are merely for purposes of description and do not necessarily apply to the position or manner in which the invention may be constructed for use.

Although the invention has been described in connection with the preferred embodiment, it is not intended to limit the invention's particular form set forth, but on the contrary, it is intended to cover such alternatives, modifications, and equivalences that may be included in the spirit and scope of the invention as defined by the appended claims.

What is claimed is:

1. A hose system for engaging a faucet comprising:
    a first hose section, said first hose section having a first arm member and a second arm member, and a faucet-connecting member, the first section further comprised of flexible walls of the first and the second arm permanently joining the faucet-connecting member at a Y-shaped first junction;
    first connector means, said first connector means located at the ends of the first arm member, the second arm member, and the faucet-connecting member which are removed from the junction, said first connector means for connecting the first section to either a hose or a faucet; and
    wherein the first hose section further includes a diverter membrane means extending from a base of the Y-shaped junction, the base of the Y-shaped junction being where the first and second arm meet, into the faucet connection member for restricting intermixing of fluid flowing through said first hose section over the length of said diverter, and terminating before said first connector means.

2. The hose system of claim 1 further comprising:
    a second hose section, said second hose section comprised of flexible walls, and having a first arm member and a second arm member and an end member, the first arm member, the second arm member, and the end member permanently joined at a second Y-shaped junction;
    second connector means, said second connector means located at the ends of the first arm member, the second arm member, and the end member, the ends being removed from the junction;
    wherein said second connector means are capable of releasably joining the first arm members of said first and second sections and said second arm members of the first and second sections.

3. The hose system of claim 2, wherein said second connector means is comprised of two socket ends, the two socket ends located on the ends of the two arm members of said second section removed from the Y-shaped junction and capable of coupling with the two threaded members of the ends of the two arm members of said first hose section, said second connector means further comprising a threaded member located on the end of the end member of said second hose section removed from the Y-shaped junction.

4. The hose system of claim 2 further comprising:
    a third hose section, the third hose section comprised of flexible walls and having third connector means at the two ends thereof, the third connector means capable of attaching to either of said first connector means or said second connector means.

5. The hose system of claim 4, wherein said first connector means is comprised of a threaded socket end capable of coupling with the faucet, the threaded socket end attached to the end of the faucet-connecting member removed from the Y-shaped junction, said first connector means further comprised of two threaded ends, one each of the two threaded ends attached to the ends of the two arm members removed from the Y-shaped junction; and wherein said second connector means is comprised of two socket ends, the two socket ends located on the ends of the two arm members of said second section removed from the Y-shaped junction and capable of coupling with the two threaded members of the ends of the two arm members of said first hose section, said second connector means further comprising a threaded member located on the end of the end member of said second hose section that is removed from the Y-shaped junction thereof.

6. The hose system of claim 2 further comprising means to attach the walls of the first arm member of said second hose section and the walls of the second arm member of said second hose section, so the walls lay adjacent one to the other.

7. The hose system of claim 6, wherein said means to attach further comprises a multiplicity of paired hook and loop type fasteners, with one of the pairs attached to the walls of the first arm member and the other of the pair attached to the walls of the second arm member, both at about the same distance from the removed ends of the arm members.

8. The hose system of claim 1 further comprising:
    a third hose section, the third hose section comprised of flexible walls and having third connector means at the two ends thereof, capable of attaching to said first connector means.

9. The hose system of claim 1, wherein said first connector means is comprised of a threaded socket end capable of, coupling with the faucet, the threaded socket end attached to the end of the faucet-connecting member removed from the Y-shaped first junction, said first connector means further comprised of two threaded ends, one each of the two threaded ends attached to the removed ends of the two arm members.

10. The hose system of claim 1 further comprising means to attach the walls of the first arm member of said first hose section and the walls of the second arm member of said first hose section, so the walls lay adjacent one to the other.

11. The hose system of claim 10, wherein said means to attach further comprises a multiplicity of paired hook and loop type fasteners, with one of the pairs attached to the walls of the first arm member and the other of the pair attached to the walls of the second arm member, both at about the same distance from the removed ends of the arm members.

* * * * *